United States Patent
Sanada et al.

(10) Patent No.: US 11,474,196 B2
(45) Date of Patent: Oct. 18, 2022

(54) RADAR DEVICE

(71) Applicant: DENSO TEN Limited, Kobe (JP)

(72) Inventors: Hiromasa Sanada, Kobe (JP); Hiroaki Yoshitake, Kobe (JP); Norihisa Nishimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 669 days.

(21) Appl. No.: 16/357,824

(22) Filed: Mar. 19, 2019

(65) Prior Publication Data

US 2019/0369207 A1 Dec. 5, 2019

(30) Foreign Application Priority Data

Jun. 5, 2018 (JP) .............................. JP2018-107838

(51) Int. Cl.
*G01S 7/00* (2006.01)
*G01S 13/931* (2020.01)
*H01Q 21/29* (2006.01)

(52) U.S. Cl.
CPC ............ *G01S 7/006* (2013.01); *G01S 13/931* (2013.01); *H01Q 21/29* (2013.01); *G01S 2013/93271* (2020.01); *G01S 2013/93275* (2020.01)

(58) Field of Classification Search
CPC ................... G01S 7/006; G01S 13/931; G01S 2013/93275; G01S 2013/93271; H01Q 21/29
See application file for complete search history.

(56) References Cited

U.S. PATENT DOCUMENTS

| 2007/0279303 A1* | 12/2007 | Schoebel | H01Q 21/065 343/713 |
| 2012/0112976 A1* | 5/2012 | Hayakawa | H01Q 21/065 343/767 |
| 2015/0054712 A1* | 2/2015 | Milyakh | H01Q 21/065 343/893 |

(Continued)

FOREIGN PATENT DOCUMENTS

| EP | 3 199 976 A1 | 8/2017 |
| JP | H10-079621 A | 3/1998 |

(Continued)

*Primary Examiner* — Junpeng Chen
(74) *Attorney, Agent, or Firm* — Oliff PLC

(57) ABSTRACT

A radar device includes: plural unit antennas, each including plural antenna elements configured to transmit or receive a radio wave, the plural antenna elements being aligned in a predetermined direction in a plane and connected by a transmission line. The plural unit antennas include a first unit antenna having plural antenna elements arranged asymmetrically with respect to a virtual straight line parallel to the predetermined direction, the virtual straight line passing through an antenna phase center of the first unit antenna, and a second unit antenna having plural antenna elements arranged asymmetrically with respect to a virtual straight line parallel to the predetermined direction passing through an antenna phase center of the second unit antenna. The plural antenna elements of the second unit antenna are arranged in a manner substantially symmetrical to the plural antenna elements of the first unit antenna with respect to the virtual straight line.

10 Claims, 6 Drawing Sheets

(56) References Cited

U.S. PATENT DOCUMENTS

| | | | |
|---|---|---|---|
| 2015/0255870 A1* | 9/2015 | Okunaga | H01Q 21/065 343/700 MS |
| 2018/0149735 A1* | 5/2018 | Lim | G01S 13/426 |
| 2018/0151958 A1* | 5/2018 | Lim | G01S 13/931 |
| 2018/0151961 A1* | 5/2018 | Lim | H01Q 1/3233 |
| 2018/0267139 A1* | 9/2018 | Park | G01S 13/931 |
| 2018/0341005 A1* | 11/2018 | Yoo | G01S 13/93 |

FOREIGN PATENT DOCUMENTS

| JP | 2005-009922 A | 1/2005 |
|---|---|---|
| JP | 2009-182580 A | 8/2009 |

\* cited by examiner

RADAR DEVICE

CROSS-REFERENCE TO RELATED APPLICATIONS

This application is based upon and claims the benefit of priority from prior Japanese patent application No. 2018-107838, filed on Jun. 5, 2018, the entire contents of which are incorporated herein by reference.

TECHNICAL FIELD

The present invention relates to a radar device.

RELATED ART

JP-A-2005-9922 discloses an object detection device for vehicle where detection areas, in which an object is to be detected, are made to be bilaterally symmetric by using deflection of directionalities of antennas. In JP-A-2005-9922, an antenna of which directionality is deflected toward a right side of a vehicle is used as a transmitting antenna, an antenna of which directionality is deflected toward a left side of the vehicle is used as a receiving antenna, and the transmitting antenna and the receiving antenna are arranged so that deflections of the directionalities thereof face each other.

In the meantime, a planar antenna provided to the radar device may be designed so that a bilaterally symmetric beam pattern is to be formed when an elevation angle, which is an angle between a beam axis and a horizontal plane, is a predetermined angle (for example, the elevation angle is zero), unlike the configuration of JP-A-2005-9922. In this design, in a configuration where radiation elements of the planar antenna are asymmetric with respect to a vertical line passing through an antenna phase center, when the elevation angle is misaligned from the predetermined angle, the beam pattern is tilted leftward or rightward, so that the bilateral symmetry is not obtained. When such a phenomenon occurs, performance deterioration of the radar device that a range in which the object can be detected is narrowed may be caused. In the meantime, the elevation angle may be misaligned from the predetermined angle due to mounting variation of the radar device to the vehicle, a change in posture of the vehicle during traveling, and the like.

SUMMARY

Aspect of non-limiting embodiments of the present disclosure relates to provide a radar device capable of suppressing an influence of angle misalignment of an antenna.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a radar device including: plural unit antennas, each of the plural unit antennas including plural antenna elements configured to transmit or receive a radio wave, the plural antenna elements being aligned in a predetermined direction in a plane and connected by a transmission line, wherein the plural unit antennas comprise a first unit antenna, plural antenna elements of which being asymmetrically arranged with respect to a virtual straight line parallel to the predetermined direction, the virtual straight line passing through an antenna phase center of the first unit antenna, and a second unit antenna, plural antenna elements of which being asymmetrically arranged with respect to a virtual straight line parallel to the predetermined direction passing through an antenna phase center of the second unit antenna, the plural antenna elements of the second unit antenna being arranged in a manner substantially symmetrical to the plural antenna elements of the first unit antenna with respect to the virtual straight line.

One of the first unit antenna and the second unit antenna may be configured as a transmitting antenna configured to transmit the radio wave and other of the first unit antenna and the second unit antenna may be configured as a receiving antenna configured to receive the radio wave.

The radar device may include plural receiving antennas configured to receive the radio wave, and the plural receiving antennas may include a first receiving antenna configured by the first unit antenna, and a second receiving antenna configured by the second unit antenna and used, as a group, with the first receiving antenna.

The radar device may include plural transmitting antennas configured to transmit the radio wave, and the plural transmitting antennas may include a first transmitting antenna configured by the first unit antenna, and a second transmitting antenna configured by the second unit antenna and used, as a group, with the first transmitting antenna.

The radar device may include at least one of a transmitting antenna configured to transmit the radio wave, the transmitting antenna including the first unit antenna and the second unit antenna a number of which is equal to a number of the first unit antenna, and a receiving antenna configured to receive the radio wave, the receiving antenna including the first unit antenna and the second unit antenna a number of which is equal to a number of the first unit antenna.

The predetermined direction may be a vertical direction.

According to the radar device of the present disclosure, an influence of the angle misalignment of the antenna may be suppressed.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of the present invention will be described in detail with reference to the drawings.

1. Outline of Radar Device

Figure 1:
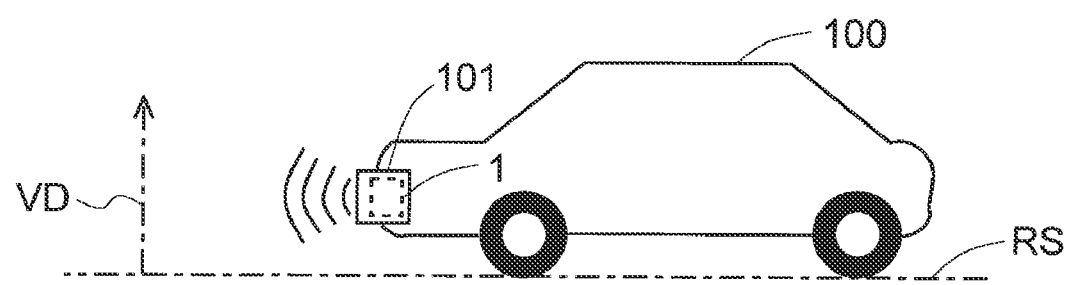
FIG. 1 is a pictorial view for illustrating an outline of a radar device.

FIG. 1 is a pictorial view for illustrating an outline of a radar device 1 according to an exemplary embodiment of the present invention. In the specification, the front and the rear are described on the basis of a traveling direction, which is the front, of a vehicle 100 traveling on a horizontal road surface RS. A direction VD perpendicular to the horizontal road surface RS is referred to as 'vertical direction'. A direction parallel with the horizontal road surface RS and perpendicular to the front and rear direction is referred to as 'right and left direction'.

As shown in FIG. 1, the radar device 1 of the exemplary embodiment is mounted on the vehicle 100 such as an automobile, for example. However, the radar device of the present invention may be mounted to a moving object other than the vehicle, such as an airplane and a ship, too.

The radar device 1 is mounted in a bumper 101 provided at a front part of the vehicle 100, and is configured to detect a target in front of the vehicle 100. The target includes other vehicles, a marker, a guardrail, a person and the like, for example. The radar device 1 is configured to transmit a radio wave in a millimeter wave band to the front of the vehicle 100, through an exterior package plate on a front surface of the bumper 101. The radar device 1 is configured to receive the radio wave reflected on the target such as a preceding vehicle, an upcoming vehicle, a road-side installation and the like. In the meantime, the radar device 1 is not limited to the front side of the vehicle 100, and may be arranged at the other positions such as a rear side of the vehicle 100. For example, when the radar device 1 is arranged at the rear side of the vehicle 100, the radar device may detect a target at the rear of the vehicle 100.

Figure 2:
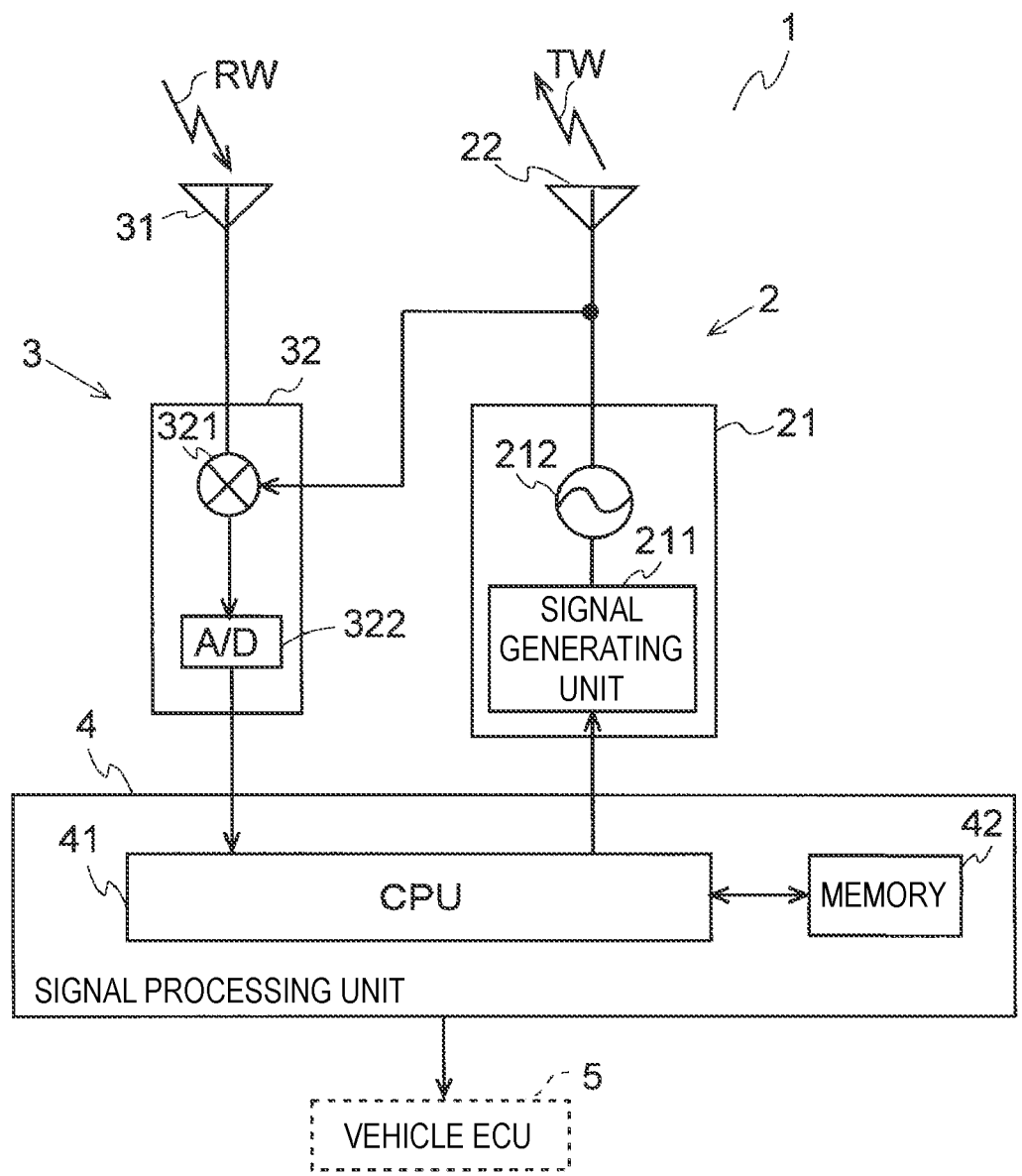
FIG. 2 is a block diagram depicting a configuration example of the radar device.

FIG. 2 is a block diagram depicting a configuration of the radar device 1 according to the exemplary embodiment of the present invention. As shown in FIG. 2, the radar device 1 includes a transmitting unit 2, a receiving unit 3, and a signal processing unit 4.

The transmitting unit 2 includes a transmission processing unit 21 and a transmitting antenna 22. The transmission processing unit 21 includes a signal generating unit 211 and an oscillator 212. The oscillator 212 is configured to modulate a signal generated at the signal generating unit 211 and to generate a transmission signal. The transmission signal is output to the transmitting antenna 22. The transmission signal is distributed to a mixer 321, too, which will be described later.

In the meantime, the transmission signal may be any high-frequency signal in a millimeter wave band of which a frequency is modulated to linearly repeat a gradual increase and a gradual decrease over time or to repeat any one of the gradual increase and the gradual decrease, for example. In the former case, the high-frequency signal is an FMCW (Frequency Modulation Continuous Wave) signal, and in the latter case, the high-frequency signal is an FCM (First Chirp Modulation) high-frequency signal. In the meantime, the radar device 1 may be a radar device in which a type other than FMCW and FCM, such as a pulse type, is adopted.

The transmitting antenna 22 is configured to convert the transmission signal output from the oscillator 212 into a transmission wave TW and to output the same. The number of the transmitting antennas 22 may be one or more, and may be appropriately changed. In the exemplary embodiment, the transmitting antenna 22 is configured as a planar antenna using a microstrip line. The planar antenna includes a dielectric substrate, and an antenna element and a ground conductor plate (all of which are not shown) formed as patterns of conductor foils such as copper on both surfaces of the dielectric substrate, and is mounted on the vehicle 100 in a direction in which the substrate surface is parallel with the vertical direction VD (refer to FIG. 1). In a case where plural transmitting antennas 22 are provided, the plural transmitting antennas are preferably formed on the same dielectric substrate. The transmission wave TW transmitted from the transmitting antenna 22 toward the front of the host vehicle is reflected on the other vehicle and the like and becomes a reflection wave RW.

The receiving unit 3 includes a receiving antenna 31 and a reception processing unit 32. The number of the receiving antennas 31 may be one or more, and may be appropriately changed. In the exemplary embodiment, like the transmitting antenna 22, the receiving antenna 31 is configured as a planar antenna using a microstrip line. In a case where plural receiving antennas 31 are provided, the plural receiving antennas are preferably formed on the same dielectric substrate. In the exemplary embodiment, the transmitting antenna 22 and the receiving antenna 31 are provided on the same dielectric substrate. For this reason, when mounting the radar device 1 to the vehicle 100, the transmitting antenna 22 and the receiving antenna 31 may cause the same angle misalignment. In the meantime, the transmitting antenna 22 and the receiving antenna 31 may be provided on different dielectric substrates. The receiving antenna 31 is configured to receive the reflection wave RW from the target, and to output a reception signal to the reception processing unit 32.

The reception processing unit 32 includes a mixer 321 and an A/D converter 322. In a case where plural receiving antennas 31 are provided, the reception processing unit 32 may be respectively provided to one receiving antenna 31. The reception signal obtained from the receiving antenna 31 is amplified in a low noise amplifier (not shown) and is then transmitted to the mixer 321. The transmission signal from the oscillator 212 is input to the mixer 321, so that the transmission signal and the reception signal are mixed in the mixer 321. Thereby, a beat signal having a beat frequency, which is a difference between a frequency of the transmission signal and a frequency of the reception signal, is generated. The beat signal generated in the mixer 321 is converted into a digital signal in the A/D converter 322, which is then output to the signal processing unit 4.

The signal processing unit 4 is configured to execute a variety of processing on the basis of the beat signal input through the A/D converter 322. The signal processing unit 4 may be configured by a microcomputer including a CPU (Central Processing Unit) 41, a memory 42 and the like. The memory 42 may include at least one of a ROM (Read Only Memory), a RAM (Random Access Memory), a flash memory and the other storage media.

In the meantime, the number of the microcomputers of the signal processing unit 4 may be one or more. Also, some or all of functions that are to be implemented as the signal processing unit 4 executes programs stored in the memory 42 may be implemented using hardware having combined a logic circuit, an analog circuit and the like.

The signal processing unit 4 is configured to execute target detection processing on the basis of the input beat signal. The target detection processing is executed as the CPU 41 reads and executes a program for target detection processing stored in the memory 42. The target detection processing includes fast Fourier transfer (FFT) processing, and peak extraction processing.

In the FFT processing, a receiving level and phase information are calculated at each frequency point (frequency bin) set with predetermined frequency intervals. In the peak extraction processing, peaks are extracted from results of the FFT processing and the like. Based on the extracted peaks, target data of the target in front of the host vehicle is deduced. In the target data, a distance to the target, a relative speed of the target, and an azimuth orientation of the target are included. The deduced target data is output to a vehicle ECU (Electrical Control Unit) 5 configured to control behaviors of the host vehicle, and the like, and is used for vehicle control such as PCS (Pre-crash Safety System), AEBS (Advanced Emergency Braking System) and the like, for example.

2. Unit Antennas

Figure 3:
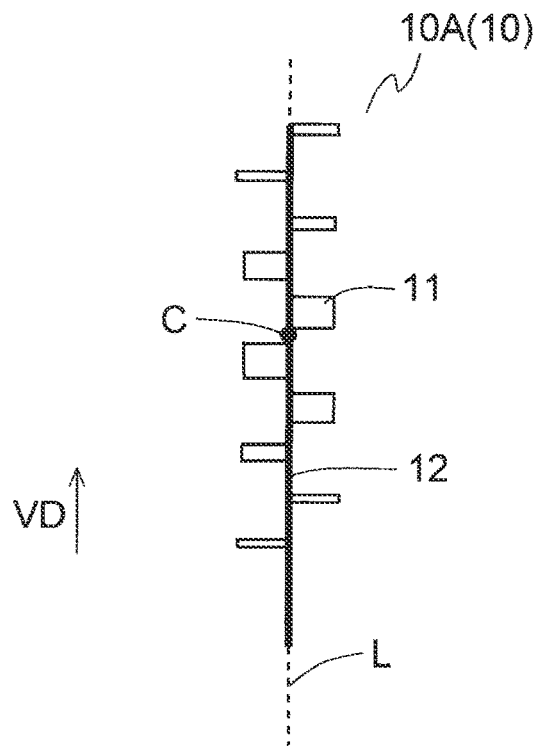
FIG. 3 depicts a configuration of a first unit antenna.
Figure 4:
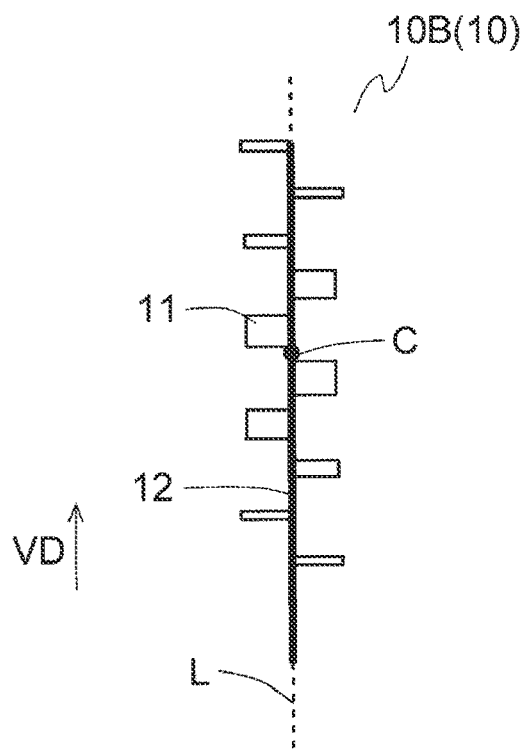
FIG. 4 depicts a configuration of a second unit antenna.

FIG. 3 depicts a configuration of a first unit antenna 10A. FIG. 4 depicts a configuration of a second unit antenna 10B. The radar device 1 includes plural unit antennas 10. The unit antenna 10 is the transmitting antenna 22 or the receiving antenna 31, or a part of the transmitting antenna 22 or the receiving antenna 31.

In the unit antenna 10, plural antenna elements 11 configured to emit or receive a radio wave is aligned in a predetermined direction in a plane. In the unit antenna 10, the plural antenna elements 11 are connected by a transmission line 12. In the exemplary embodiment, the predetermined direction is the vertical direction VD. By the configuration, it is possible to implement an antenna configuration having a narrow directionality in the vertical direction and capable of detecting a target with a wide angle in the horizontal direction. The plural unit antennas 10 of the radar device 1 include a first unit antenna 10A and a second unit antenna 10B.

As shown in FIG. 3, the first unit antenna 10A includes plural antenna elements 11 and a transmission line 12. The plural antenna elements 11 are radiation elements in a case where the first unit antenna 10A configures all or a part of the transmitting antenna 22. The plural antenna elements 11 are receiving elements when the first unit antenna 10A configures all or a part of the receiving antenna 31. The transmission line 12 configured to electrically connect the plural antenna elements 11 has a linear shape extending in the vertical direction. However, the transmission line 12 is not limited to have the linear shape, and may have a curve shape or a mixed shape of a line and a curve, for example.

In the exemplary embodiment, a power feeding direction to the transmission line 12 is a direction from a lower side in the vertical direction toward an upper side in the vertical direction. However, this is just exemplary. For example, the power feeding direction to the transmission line 12 may be a direction from the upper side in the vertical direction toward the lower side in the vertical direction. Also, a power feeding place to the transmission line 12 is not particularly limited, and may be, for example, any one of both ends of the transmission line 12 in the vertical direction or an intermediate position of the transmission line 12. In the meantime, the shape and the position of a power feeding point of the transmission line are more preferably similar to each other between the antennas but may be different between the antennas. Also, the shape and position may be different from the second unit antenna, which will be described later.

At left and right sides of the transmission line 12, the plural antenna elements 11 disposed with predetermined intervals along the transmission line 12 are arranged. In the exemplary embodiment, the same numbers of the antenna elements 11 are arranged at the left and right sides of the transmission line 12. However, the number of the antenna elements 11 to be arranged at the left side of the transmission line 12 and the number of the antenna elements 11 to be arranged at the right side of the transmission line 12 may be different from each other. In the exemplary embodiment, left and right positions, at which the antenna elements 11 are arranged, of the transmission line 12 are offset in the vertical direction. That is, in the first unit antenna 10A, the plural antenna elements 11 are asymmetrically arranged with respect to a virtual straight line L parallel with the vertical direction passing through an antenna phase center C of the first unit antenna 10A.

In the meantime, the antenna phase center C is defined as a center of a curvature of an equiphase plane of a radiation wave in a far field. The antenna phase center C is not a center of a mechanistic antenna but is a position of an effective wave source, and may be regarded as a virtual concentration point of radio waves in radiation and incidence of radio waves. Also, the shape of the first unit antenna 10A is not limited to the shape shown in FIG. 3. The number of the antenna elements 11 may be appropriately changed, and the shape where the plural antenna elements 11 are asymmetrically arranged with respect to the virtual straight line L may also be changed as appropriate. For example, the plural antenna elements 11 may be arranged only at one side of the left and right sides of the transmission line 12.

As shown in FIG. 4, the second unit antenna 10B includes plural antenna elements 11 and a transmission line 12. The plural antenna elements 11 are radiation elements in a case where the second unit antenna 10B configures all or a part of the transmitting antenna 22. The plural antenna elements 11 are receiving elements in a case where the second unit antenna 10B configures all or a part of the receiving antenna 31.

Also in the second unit antenna 10B, the plural antenna elements 11 disposed with predetermined intervals along the transmission line 12 are arranged at left and right sides of the transmission line 12. Left and right positions, at which the antenna elements 11 are arranged, of the transmission line 12 are offset in the vertical direction. However, the second unit antenna 10B has a shape different from the first unit antenna 10A. Specifically, arrangement of the antenna elements of the second unit antenna 10B is substantially symmetrical to arrangement of the antenna elements of the first unit antenna 10A with respect to the virtual straight line L. That is, the first unit antenna 10A and the second unit antenna 10B have outer shapes where the antenna elements 11 are substantially symmetrical with respect to the virtual straight line L. The transmission line 12 and the power feeding point between the antenna elements 11 may have different shapes and arrangements between the first unit antenna 10A and the second unit antenna 10B. In the exemplary embodiment, the shapes and arrangements are the same between the first unit antenna 10A and the second unit antenna 10B. Also, in the exemplary embodiment, the rectangular antenna elements 11 are arranged in the direction perpendicular to the virtual straight line L. However, the present invention is not limited thereto. For example, the rectangular antenna elements 11 may be arranged obliquely relative to the virtual straight line L. Also, the antenna element 11 may not be rectangular. Also in this case, the second unit antenna 10B is configured so that the outer shape of the antenna elements 11 is substantially symmetrical to the first unit antenna 10A with respect to the virtual straight line L. That is, the description "arrangement of the antenna elements is symmetrical" means that the antenna elements are symmetrically arranged, including positions, angles, shapes and the like.

In the meantime, the second unit antenna 10B is preferably configured so that the antenna elements 11 are arranged symmetrically to the antenna elements of the first unit antenna 10A with respect to the virtual straight line L, but may be configured such that the antenna elements 11 are arranged in an approximately symmetrical manner. For example, the number of the antenna elements 11 of the second unit antenna 10B may be slightly different, as compared to the first unit antenna 10A. For example, at least one antenna element 11 may be added or omitted at an upper end side or a lower end side of the second unit antenna 10B in the vertical direction. In a case where the approximately symmetrical manner is employed, the arrangement is preferably changed at a position distant from the antenna phase center C of the second unit antenna 10B.

Since the plural antenna elements 11 of the first unit antenna 10A are asymmetrically arranged with respect to the virtual straight line L, the first unit antenna 10A has asymmetric performance. This configuration may be synonymous with a configuration that the first unit antenna 10A has always asymmetric performance but may not be synonymous with the configuration. That is, the first unit antenna 10A may be configured so that it has bilaterally symmetric performance under predetermined conditions and has asymmetric performance when it deviates from the predetermined conditions. For example, the first unit antenna 10A may be configured so that a bilaterally symmetric beam pattern is to be formed when an elevation angle is zero, i.e., a beam axis of the first unit antenna 10A is parallel with a horizontal plane and an asymmetric beam pattern is to be formed when the elevation angle, which is an angle between the beam axis and the horizontal plane, is misaligned from zero.

Since the plural antenna elements 11 of the second unit antenna 10B are also asymmetrically arranged with respect to the virtual straight line L, the second unit antenna 10B has asymmetric performance. In the meantime, since the arrangement of the antenna elements of the second unit antenna 10B is substantially symmetric to the arrangement of the antenna elements of the first unit antenna 10A with respect to the virtual straight line L, the asymmetry property of the second unit antenna 10B is opposite to the first unit antenna 10A. For this reason, in the radar device 1, the first unit antenna 10A and the second unit antenna 10B are used in combination as a group, so that it may be possible to complement the performances thereof and to thus obtain characteristics of which a left and right difference is small.

3. Specific Examples of Antenna Configuration

In the below, specific examples of the antenna configuration of the radar device 1 are described.

3-1. First Example

In the first example, one of the first unit antenna 10A and the second unit antenna 10B is the transmitting antenna 22 configured to transmit a radio wave, and the other is the receiving antenna 31 configured to receive the radio wave. Here, as an example, the first unit antenna 10A is configured as the transmitting antenna 22, and the second unit antenna 10B is configured as the receiving antenna 31.

In the first example, for example, the first unit antenna 10A and the second unit antenna 10B are designed so that a bilaterally symmetric beam pattern is to be formed when the elevation angle is zero. When the elevation angle is misaligned from zero, the beam pattern of each of the unit antennas 10A, 10B becomes asymmetric. The first unit antenna 10A and the second unit antenna 10B are opposite to each other in terms of the asymmetric shape of the beam pattern. That is, in the transmitting antenna 22 and the receiving antenna 31, the asymmetric shapes of the beam patterns that are formed when the elevation angle is misaligned from zero are opposite to each other.

In the meantime, the elevation angle may be misaligned from zero due to mounting variation of to the antenna, dimension variation of the antenna, characteristic variation of the antenna, a change in posture of the vehicle during traveling, and the like, for example. The characteristic variation of the antenna is caused due to variation of environment temperature around the antenna, for example. The change in posture of the vehicle 100 is caused when the vehicle 100 is braked, when a luggage is loaded in a luggage room of the vehicle 100, and the like, for example.

Figure 5:
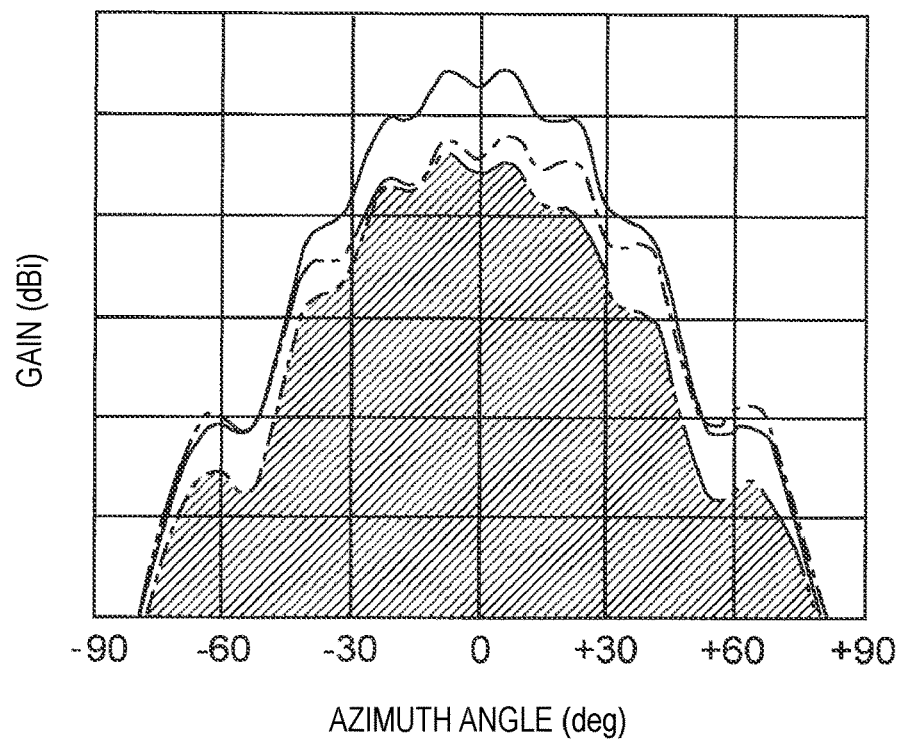
FIG. 5 depicts a beam pattern in a horizontal direction, in a comparative example.

FIG. 5 depicts a beam pattern in a horizontal direction, in a comparative example. In the comparative example, both the transmitting antenna 22 and the receiving antenna 31 are configured by the first unit antenna 10A. In FIG. 5, a horizontal axis indicates an azimuth angle (°) in the horizontal direction. In the comparative example, the azimuth angle is plus at the right side, and is minus at the left side. In FIG. 5, a vertical axis indicates a gain of antenna (dBi).

The beam pattern shown in FIG. 5 is a pattern of a transmission/reception combined bean obtained by multiplying a beam pattern transmitted from the transmitting antenna 22 and a beam pattern received at the receiving antenna 31. In FIG. 5, the solid line indicates a beam pattern formed when the elevation angle is zero, the dashed-dotted line indicates a beam pattern formed when the elevation angle is misaligned (−7°) toward the minus direction, and the dashed-two dotted line indicates a beam pattern formed when the elevation angle is misaligned (+7°) toward the plus direction.

As shown in FIG. 5, when the elevation angle is misaligned from zero, the gain is lowered and the bilateral symmetry property of the beam pattern is deteriorated. The comparative example of FIG. 5 shows the asymmetry property that as the elevation angle is misaligned toward the minus direction, the right gain increases, as compared to the left gain. On the other hand, in the asymmetry property, as the elevation angle is misaligned toward the plus direction, the left gain increases, as compared to the right gain. In the comparative example of FIG. 5, the part shown with the oblique lines indicates a performance guarantee range within a range of the elevation angle −7° to +7°. When an absolute value of the azimuth angle increases, the gain of the antenna is reduced and a detection area of the target is narrowed.

Figure 6:
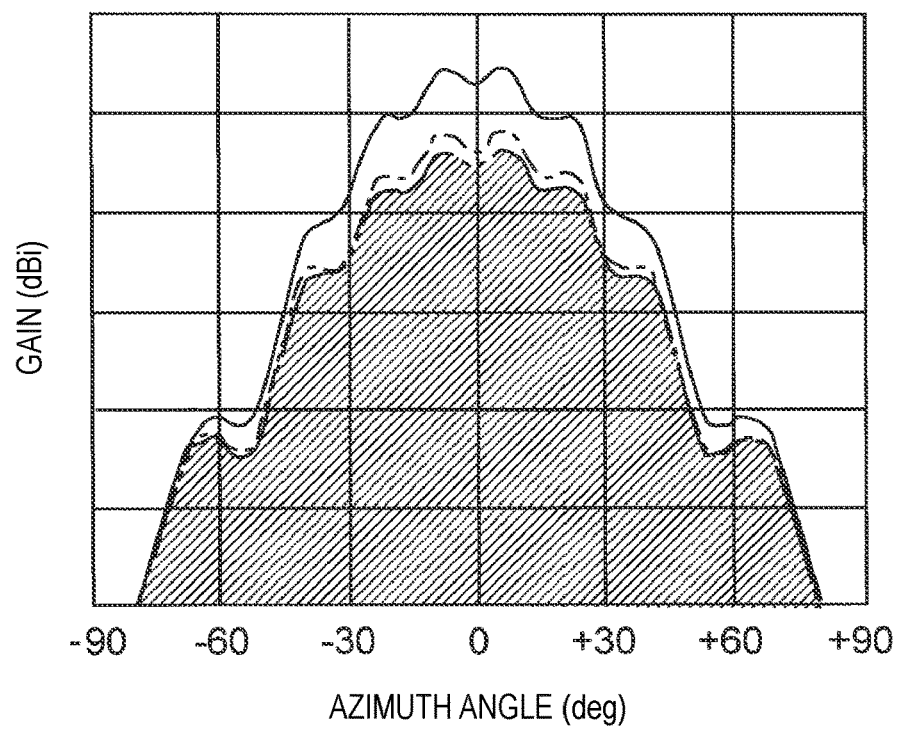
FIG. 6 depicts a beam pattern in a horizontal direction, in a first example.

FIG. 6 depicts a beam pattern in a horizontal direction, in the first example. In FIG. 6, a horizontal axis indicates an azimuth angle (°) in the horizontal direction. In FIG. 6, a vertical axis indicates a gain of antenna (dBi). The beam pattern shown in FIG. 6 is a pattern of a transmission/reception combined bean obtained by multiplying a beam pattern transmitted from the transmitting antenna 22 and a beam pattern received at the receiving antenna 31. In FIG. 6, the solid line indicates a beam pattern formed when the elevation angle is zero, the dashed-dotted line indicates a beam pattern formed when the elevation angle is misaligned (−7°) toward the minus direction, and the dashed-two dotted line indicates a beam pattern formed when the elevation angle is misaligned (+7°) toward the plus direction.

In FIG. 6, when the elevation angle is misaligned from zero, the gain is lowered. However, even when the elevation angle is misaligned from zero, the bilateral symmetry property of the beam pattern is roughly kept. In the performance guarantee range shown with the oblique lines, a decrease in gain when the absolute value of the azimuth angle is increased is smaller, as compared to the comparative example of FIG. 5, and the detection area of the target is suppressed from being narrowed. This is because the transmitting antenna 22 and the receiving antenna 31 in which the first unit antenna 10A and the second unit antenna 10B are used in combination as a group and the performances of the transmitting antenna 22 and the receiving antenna 31 may be complemented each other.

In the above, the number of the transmitting antenna 22 configured by the first unit antenna 10A and the number of the receiving antenna 31 configured by the second unit antenna 10B are respectively one. However, it is just exemplary. For example, the number of the transmitting antenna 22 configured by the first unit antenna 10A may be one and the number of the receiving antenna 31 configured by the second unit antenna 10B may be plural. For example, when the number of the receiving antenna 31 configured by the second unit antenna 10B is two, a radar device capable of estimating an azimuth of a target by MUSIC (Multiple Signal Classification), ESPRIT (Estimation of Signal Parameters via Rotational Invariance Techniques) and the like is obtained. Also in this modified embodiment, a combination of the transmitting antenna 22 and each receiving antenna 31 is a combination of the first unit antenna 10A and the second unit antenna 10B, so that it may be possible to secure the bilateral symmetry property with complementing the performances each other.

Also, both in the transmitting antenna 22 configured by the first unit antenna 10A and the receiving antenna 31 configured by the second unit antenna 10B, the number of antennas may be plural. For example, the number of the transmitting antenna 22 configured by the first unit antenna 10A may be two and the number of the receiving antenna 31 configured by the second unit antenna 10B may be four. By this configuration, it is possible to configure a MIMO (Multiple Input Multiple Output) radar of which the number of virtual antennas is eight. Also in this modified embodiment, a combination of each transmitting antenna 22 and each receiving antenna 31 is a combination of the first unit antenna 10A and the second unit antenna 10B, so that it may be possible to secure the bilateral symmetry property with complementing the performances each other.

3-2. Second Example

Figure 7:
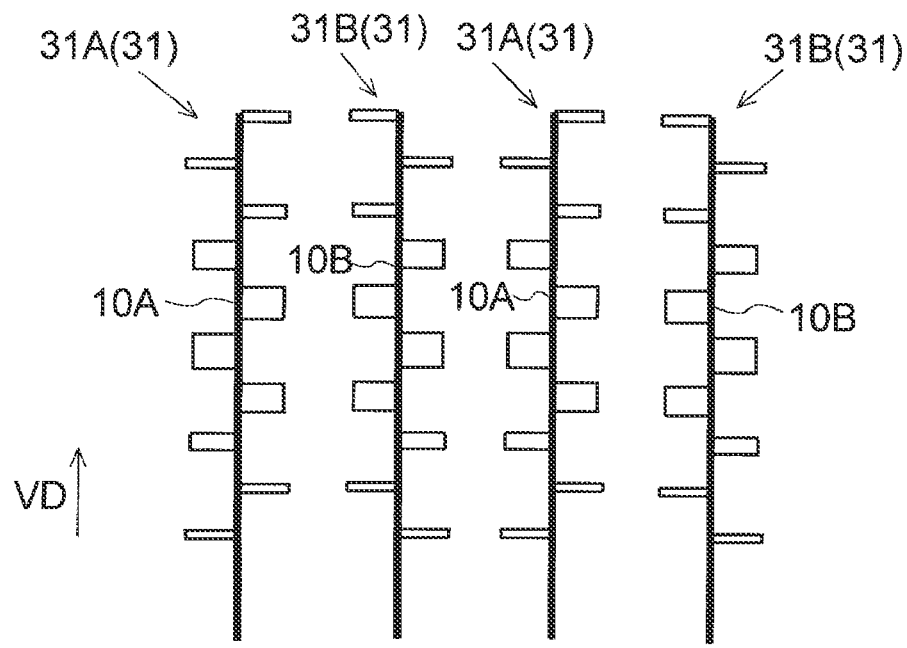
FIG. 7 illustrates an antenna configuration of a second example.

FIG. 7 depicts an antenna configuration of a second example. As shown in FIG. 7, the radar device 1 of the second example includes plural receiving antennas 31 configured to receive a radio wave. The plural receiving antennas 31 are arranged with predetermined intervals in the right and left direction. In the second example, the number of the receiving antennas 31 is four. The reception signals received at the respective receiving antennas 31 are individually processed in the reception processing unit 32 and input to the signal processing unit 4.

The plural receiving antennas 31 include first receiving antennas 31A, and second receiving antennas 31B. The numbers of the first receiving antennas 31A and the second receiving antennas 31B are the same. In the second example, the numbers of the first receiving antennas 31A and the second receiving antennas 31B are respectively two. In the meantime, the numbers of the first receiving antennas 31A and the second receiving antennas 31B are not particularly limited inasmuch as both the numbers are the same.

The first receiving antenna 31A is configured by the first unit antenna 10A. The second receiving antenna 31B is configured by the second unit antenna 10B, and is used in combination with the first receiving antenna 31A as a group. In the example of FIG. 7, the first receiving antenna 31A, the first receiving antenna 31A, the second receiving antenna 31B, and the second receiving antenna 31B are aligned in corresponding order from the left toward the right on the drawing sheet. The alignment order is just exemplary, and the alignment order in the right and left direction may be appropriately changed from the alignment order shown in FIG. 7. For example, the first unit antenna 10A and the second unit antenna 10B may be designed so that a bilaterally symmetric beam pattern is to be formed when the elevation angle is zero.

In the meantime, the number of the transmitting antennas 22 is one, in the second example. However, the number of the transmitting antennas 22 may be plural. Although the configuration of the transmitting antenna 22 is not particularly limited, it is preferably configured so that a bilaterally symmetric beam pattern is to be formed, irrespective of the elevation angle.

The respective signals input from the four receiving antennas 31 to the signal processing unit 4 are individually subjected to the FFT processing and the peak extraction processing. In the second example, an average value of the peaks obtained as a result of the processing of the signals from the respective receiving antennas 31 is calculated to extract a final peak.

In the second example, the plural receiving antennas 31 include the same numbers of the first receiving antennas 31A and the second receiving antennas 31B of which the asymmetry properties are opposite to each other. For this reason, the result obtained by averaging the signals from the respective receiving antennas 31 is a result in which the asymmetry properties are complemented each other. For example, in the azimuth estimation processing, the average may be calculated for the antennas adjacent to each other. In this case, for the arrangement of FIG. 7, since the adjacent antennas are all the combination of the first unit antenna 10A and the second unit antenna 10B, it is possible to complement the asymmetry properties without performing a special change for the previous processing. For this reason, it is possible to suppress the performance deterioration, which is caused due to the asymmetry property. In the meantime, the arrangement of the plural receiving antennas 31 is not limited to the arrangement shown in FIG. 7. For example, the first unit antennas 10A may be adjacent to each other or the second unit antennas 10B may be adjacent to each other. Also, in the configuration of the second example, when the transmitting antenna 22 has asymmetry performance, the asymmetry performance remains.

3-3. Third Example

Figure 8:
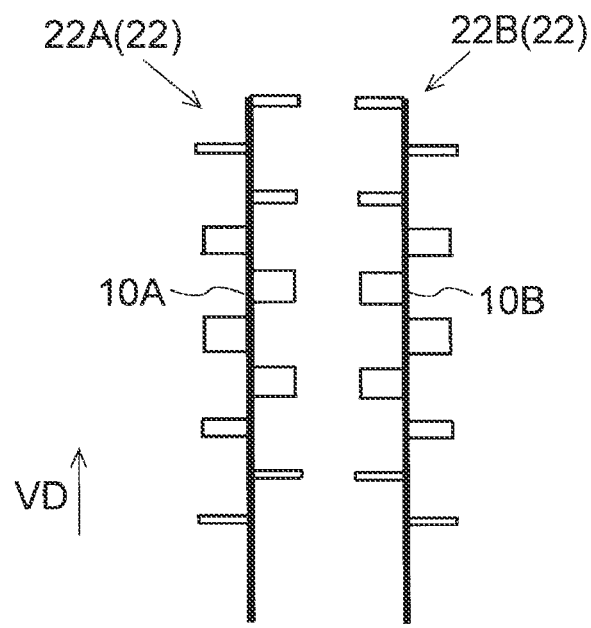
FIG. 8 illustrates an antenna configuration of a third example.

FIG. 8 depicts an antenna configuration of a third example. As shown in FIG. 8, the radar device 1 of the third example includes plural transmitting antennas 22 configured to transmit a radio wave. The plural transmitting antennas 22 are arranged with predetermined intervals in the right and left direction. In the third example, the number of the transmitting antennas 22 is two.

The plural transmitting antennas 22 include a first transmitting antenna 22A and a second transmitting antenna 22B. The numbers of the first transmitting antenna 22A and the second transmitting antenna 22B are the same. In the third example, the numbers of the first transmitting antenna 22A and the second transmitting antenna 22B are respectively one. In the meantime, the numbers of the first transmitting antenna 22A and the second transmitting antenna 22B are not particularly limited inasmuch as they are the same. In the third example of FIG. 8, the first transmitting antenna 22A and the second transmitting antenna 22B are aligned in corresponding order from the left toward the right on the drawing sheet. The alignment order is just exemplary, and the alignment order in the right and left direction may be appropriately changed from the alignment order shown in FIG. 8.

The first transmitting antenna 22A is configured by the first unit antenna 10A. The second transmitting antenna 22B is configured by the second unit antenna 10B and is used with being combined with the first transmitting antenna 22A. In the third example, the first transmitting antenna 22A and the second transmitting antenna 22B output the transmission wave TW at the same time. That is, a combined wave from the two transmitting antennas 22A, 22B is used as the transmission wave for detecting a target. The combined wave is used, so that a transmission power increases and a transmission range may be thus increased.

In the meantime, each of the plural transmitting antennas 22 may be provided with a switch and the transmission wave TW may be individually transmitted from each of the transmitting antennas 22. Also, for example, the first unit antenna 10A and the second unit antenna 10B may be designed so that a bilaterally symmetric beam pattern is to be formed when the elevation angle is zero.

The number of the receiving antennas 31 may be at least one or more. Although the configuration of the receiving antenna 31 is not particularly limited, the configuration described in the second example is preferable so as to suppress the asymmetry performance, for example. For example, as shown in FIG. 7, the number of the receiving antennas 31 may be four, and two of the four receiving antennas may be configured as the first receiving antennas 31A and the other may be configured as the second receiving antennas 31B.

In the third example, the plural transmitting antennas 22 include the same numbers of the first transmitting antenna 22A and the second transmitting antenna 22B of which the asymmetry properties are opposite to each other. For this reason, the combined wave obtained by combining the respective transmitting antennas 22 becomes a bilaterally symmetric beam pattern with complementing the asymmetry properties each other. For this reason, it is possible to suppress the performance deterioration, which is caused due to the asymmetry property.

3-4. Fourth Example

In a fourth example, the radar device 1 has at least one of the transmitting antenna 22 including the same numbers of the first unit antenna 10A and the second unit antenna 10B and configured to transmit a radio wave and the receiving antenna 31 including the same numbers of the first unit antenna 10A and the second unit antenna 10B and configured to receive the radio wave. In the below, an example where the radar device 1 has both of the transmitting antenna 22 including the same numbers of the first unit antenna 10A and the second unit antenna 10B and the receiving antenna 31 including the same numbers of the first unit antenna 10A and the second unit antenna 10B is described.

Figure 9:
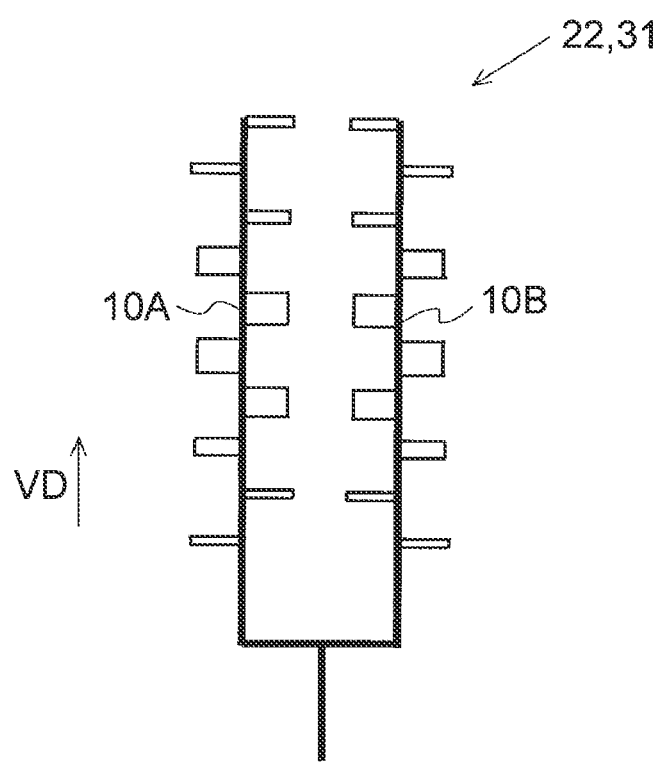
FIG. 9 illustrates an antenna configuration of a fourth example.

FIG. 9 depicts an antenna configuration of the fourth example. As shown in FIG. 9, both the transmitting antenna 22 and the receiving antenna 31 are configured by one first unit antenna 10A and one second unit antenna 10B. The first unit antenna 10A and the second unit antenna 10B are aligned with a predetermined interval in the right and left direction. In the two unit antennas 10A, 10B aligned with the predetermined interval in the right and left direction, one ends (power feeding ends) of the transmission lines 12 in the vertical direction VD are electrically connected to each other. The transmitting antenna 22 and the receiving antenna 31 are so-called array antennas.

In the fourth example of FIG. 9, the first unit antenna 10A, the second unit antenna are aligned in corresponding order from the left toward the right on the drawing sheet. The alignment order is just exemplary, and the alignment order in the right and left direction may be changed from the alignment order shown in FIG. 9. The alignment order may be different between the transmitting antenna 22 and the receiving antenna 31.

In the meantime, the transmitting antenna 22 and the receiving antenna 31 may be configured by the same numbers of the first unit antenna 10A and the second unit antenna 10B, and may be configured by plural first unit antennas 10A and plural second unit antennas 10B. Also, for example, the first unit antenna 10A and the second unit antenna 10B may be designed so that a bilaterally symmetric beam pattern is to be formed when the elevation angle is zero.

The radar device 1 may be configured by at least one transmitting antenna 22 and at least one receiving antenna 31. For example, the radar device 1 may be configured by one transmitting antenna 22 and the four receiving antennas 31.

In the transmitting antenna 22, the transmission wave TW is transmitted from the first unit antenna 10A and the second unit antenna 10B at the same time. In the receiving antenna 31, the reflection wave RW is received substantially at the same time by the first unit antenna 10A and the second unit antenna 10B.

In the fourth example, each of the transmitting antenna 22 and the receiving antenna 31 includes the same numbers of the first unit antenna 10A and the second unit antenna 10B of which the asymmetry properties are opposite to each other. For this reason, in each of the transmitting antenna 22 and the receiving antenna 31, the asymmetry properties may be complemented each other. For this reason, it is possible to suppress the performance deterioration, which is caused due to the asymmetry property.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

In the above, the plural antenna elements 11 of the unit antenna 10 are aligned in the vertical direction VD. However, this is just exemplary. The present invention may be applied to a configuration where the plural antenna elements 11 of the unit antenna 10 are aligned in the horizontal direction, too. In this case, it may be possible to suppress the performance deterioration, which is caused due to the asymmetry property in the vertical direction.

What is claimed is:

1. A radar device comprising:
   a plurality of unit antennas, each of the plurality of unit antennas comprising a plurality of antenna elements configured to transmit or receive a radio wave, the plurality of antenna elements being aligned in a predetermined direction in a plane and connected by a transmission line,
   wherein the plurality of unit antennas comprises
      a first unit antenna comprising a plurality of antenna elements asymmetrically arranged with respect to a virtual straight line parallel to the predetermined direction, the virtual straight line passing through an antenna phase center of the first unit antenna, and
      a second unit antenna comprising a plurality of antenna elements asymmetrically arranged with respect to a virtual straight line parallel to the predetermined direction passing through an antenna phase center of the second unit antenna, an asymmetry property of arrangements of the plurality of antenna elements of the second unit antenna being opposite to an asymmetry property of arrangements of the plurality of antenna elements of the first unit antenna.

2. The radar device according to claim 1, wherein one of the first unit antenna and the second unit antenna is configured as a transmitting antenna configured to transmit the radio wave and the other of the first unit antenna and the second unit antenna is configured as a receiving antenna configured to receive the radio wave.

3. The radar device according to claim 1, comprising a plurality of receiving antennas configured to receive the radio wave, wherein
   the plurality of receiving antennas comprise
      a first receiving antenna configured by the first unit antenna, and
      a second receiving antenna configured by the second unit antenna and used, as a group, with the first receiving antenna.

4. The radar device according to claim 1, comprising a plurality of transmitting antennas configured to transmit the radio wave, wherein
   the plurality of transmitting antennas comprises
      a first transmitting antenna configured by the first unit antenna, and
      a second transmitting antenna configured by the second unit antenna and used, as a group, with the first transmitting antenna.

5. The radar device according to claim 1, comprising at least one of
   a transmitting antenna configured to transmit the radio wave, the transmitting antenna comprising the first unit antenna and the second unit antenna a number of which is equal to a number of the first unit antenna, and
   a receiving antenna configured to receive the radio wave, the receiving antenna comprising the first unit antenna and the second unit antenna a number of which is equal to a number of the first unit antenna.

6. The radar device according to claim 1, wherein the predetermined direction is a vertical direction.

7. The radar device according to claim 2, wherein the predetermined direction is a vertical direction.

8. The radar device according to claim 3, wherein the predetermined direction is a vertical direction.

9. The radar device according to claim 4, wherein the predetermined direction is a vertical direction.

10. The radar device according to claim 5, wherein the predetermined direction is a vertical direction.

* * * * *